(12) United States Patent
Nee et al.

(10) Patent No.: US 6,947,416 B1
(45) Date of Patent: Sep. 20, 2005

(54) GENERALIZED ASYNCHRONOUS HDLC SERVICES

(75) Inventors: Cheng-Lee Nee, San Jose, CA (US); Anthony Wu, Palo Alto, CA (US); Quingming Ma, Cupertino, CA (US); Amar Amar, Fremont, CA (US); Chongzhen Wang, San Jose, CA (US); Winston Yuan, San Jose, CA (US); Minglei Yang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 738 days.

(21) Appl. No.: 09/736,967

(22) Filed: Dec. 13, 2000

(51) Int. Cl.⁷ .............................. H04L 3/16
(52) U.S. Cl. .................... 370/389; 370/466
(58) Field of Search .................. 370/329, 389, 370/392, 397, 399, 437, 447, 461, 462, 466, 370/467, 465, 401, 428

(56) References Cited

U.S. PATENT DOCUMENTS

| | | | |
|---|---|---|---|
| 5,699,356 A * | 12/1997 | Beever et al. | 370/329 |
| 6,448,682 B2 * | 9/2002 | Sakagami et al. | 310/216 |
| 6,526,451 B2 * | 2/2003 | Kasper | 709/250 |
| 6,587,460 B1 * | 7/2003 | Bell et al. | 370/385 |
| 2004/0028067 A1 * | 2/2004 | Chong et al. | 370/412 |

OTHER PUBLICATIONS

W. Simpson "The Point-to-Point Protocol (PPP)," RFC 1661, Internet Engineering Task Force, Jul. 1994.
W. Simpson "PPP in HDLC-like Framing," RFC 1662, Internet Engineering Task Force, Jul. 1994.
C. Bormann "PPP in a Real-time Oriented HDLC-like Framing," RFC 2687, Internet Engineering Task Force, Sep. 1999.

* cited by examiner

*Primary Examiner*—Dang Ton
(74) *Attorney, Agent, or Firm*—Aka Chan LLP

(57) ABSTRACT

A router in a network comprises an interface system for receiving packets and has a plurality of channels and a plurality of framing service engines. The router is configured to assign the channels to individual framing service engines for framing services. The router has a channel manager for performing the assignments, and the channel manager is configured to receive and use data about the framing service engines. The router further comprises a framing memory for buffering communication between the interface system and the plurality of framing service engines. At least one framing service engine is configured to frame packets and at least one framing service engine is configured to deframe packets, and the framing service engines may be configured to operate on AHDLC packets. The router can be used with an interface system that comprises a plurality of network interfaces terminating a plurality of point to point links.

7 Claims, 5 Drawing Sheets

GENERALIZED ASYNCHRONOUS HDLC SERVICES

BACKGROUND OF THE INVENTION

The present invention relates to data networking and more particularly to providing framing services on a network employing other protocols such as Internet Protocol (IP) and Point-to-Point Protocol (PPP).

In order to accommodate Internet and other traffic over a wireless network, an architecture has been designed to transport IP and other data seamlessly. An overall architecture for a wireless IP network architecture based on various protocols has been described in the Internet Engineering Task Force's Wireless IP Network Architecture based on IETF Protocols (Tom Hiller, ed.), IETF TR45.6 Ballot (Feb. 4, 2000), the disclosure of which is hereby incorporated by reference. This document describes the packet data services to be provided, and sets forth the packet data system architecture for a third generation wireless system based on IMT-2000. The described system is designed to have general capabilities that match those outlined in the ITU IMT-2000 requirements document Q.1701. IETF protocols are employed wherever possible to minimize the number of new protocols required.

An example of the architecture described is shown in FIG. 1. A user uses mobile station 10 to connect to Radio Network 20 via an air interface, and through the Radio Network 20, gains access to a service provider network. Only one service provider network may be accessed by the mobile station 10 at a time, and the service provider network may be the user's home access provider or if the user is roaming, the visited access provider network. Existing air interface procedures are used for access mobility management, including interactions with Visited Location Registers (VLR) 32 and Home Location Registers (HLR) 34. The HLR 34 stores access service profiles that contain information about access service parameters, which are cached in the VLR 32 while the mobile station 10 is registered in the service provider access network. An open interface, known as the R-P interface, is defined between the Radio Network 20 and the Packet Data Serving Node (PDSN) 30. The PDSN 30 interacts with the local or visited AAA (Authentication, Authorization, and Accounting) server 36 and with other servers using IP protocols within the IP Network 38.

FIG. 2 shows a protocol reference model for mobile IP control and Internet Key Exchange (IKE). This model depicts the control and user data protocol relationships among the mobile station 10, Radio Network 20, PDSN 30, end host, and, in the case of mobile IP, the Home Agent (HA). As shown, the mobile station uses Airlink, Medium Access Control (MAC), Local Access Control (LAC), Point to Point Protocol (PPP), Internet Protocol (IP), User Datagram Protocol (UDP), and Mobile Internet Protocol (MIP). The radio network uses Airlink, MAC, and LAC to communicate with the mobile station. To communicate with the PDSN, the radio network uses Physical Layer (PL) and R-P (Radio Network to PDSN). The PDSN uses PL, R-P, PPP (terminating the PPP connection from the mobile station), IP, UDP, and MIP. To communicate with the HA, the PDSN uses PL, Link Layer, IP/IPsec (secure IP), UDP, and IKE. The HA's protocol stack is similar. The servers contacted by the PDSN 30 or local AAA server may reside in other IP domains and be operated by other IMT-2000 operators, ISPs, or Private Network operators. Further details of the model, such as service provider boundaries and logical interfaces among different boundary configurations, may be seen by reference to the IETF document.

In a typical system, the data link layer provides a point to point link between mobile station 10 and PDSN 30. Operating the point to point link requires that certain services be provided at both ends including framing and deframing, synchronization, error correction, etc. In particular, providing framing services is a key function in operating the point to point link between mobile station 10 and PDSN 30. Data packets from higher layer protocols are framed before being transmitted over the point to point link, and deframed at the receiving side before being forwarded for further processing. While mobile station 10 may only operate one or a small number of point to point links simultaneously, even a single interface of PDSN 30 may terminate point to point links to numerous mobile stations. If PDSN 30 is implemented by a typical router architecture, each interface will have its own single framing engine to provide framing and deframing services to multiple point to point connections. Multiple data streams are sent by each interface to its own single framing engine for framing and/or deframing services. Often a framing engine associated with one interface will have unused cycles while a number of data streams are backed up on another interface awaiting framing or deframing. There is a need, therefore, for an improved architecture for providing improved framing/deframing services.

SUMMARY OF THE INVENTION

A router in a network comprises an interface system for receiving packets and has a plurality of channels and a plurality of framing service engines. The router is configured to assign the channels to individual framing service engines for framing services. The router has a channel manager for performing the assignments, and the channel manager is configured to receive and use data about the framing service engines. The router further comprises a framing memory for buffering communication between the interface system and the plurality of framing service engines. At least one framing service engine is configured to frame packets and at least one framing service engine is configured to deframe packets, and the framing service engines may be configured to operate on AHDLC packets. The router can be used with an interface system that comprises a plurality of network interfaces terminating a plurality of point to point links.

A further understanding of the nature and advantages of the inventions herein may be realized by reference to the remaining portions of the specification and the attached drawings.

DESCRIPTION OF SPECIFIC EMBODIMENTS

Generally, the packet processing and management techniques of the present invention may be implemented in software and/or hardware. For example, they can be implemented in an operating system kernel, in separate user processes, in a library package bound into a network application, on a specially constructed machine, or on a network interface card. In specific embodiment of this invention, these techniques may be implemented in software such as an operating system or in an application running on an operating system.

A software or software/hardware hybrid packet processing and management system of this invention is preferably implemented on a general-purpose programmable machine selectively activated or reconfigured by a computer program stored in memory. Such a programmable machine may be a network device designed to handle network traffic. Such network devices typically have multiple network interfaces including frame relay and ISDN interfaces, for example. Specific examples of such network devices include routers and switches. For example, the packet processing and management systems of this invention may operate on specially configured routers such as those available from Cisco Systems, Inc. of San Jose, Calif. A general architecture for some of these machines will appear from the description given below. In an alternative embodiment, the packet processing system may be implemented on a general-purpose network host machine such as a personal computer or workstation adapted to interface with computer networks.

Figure 3:
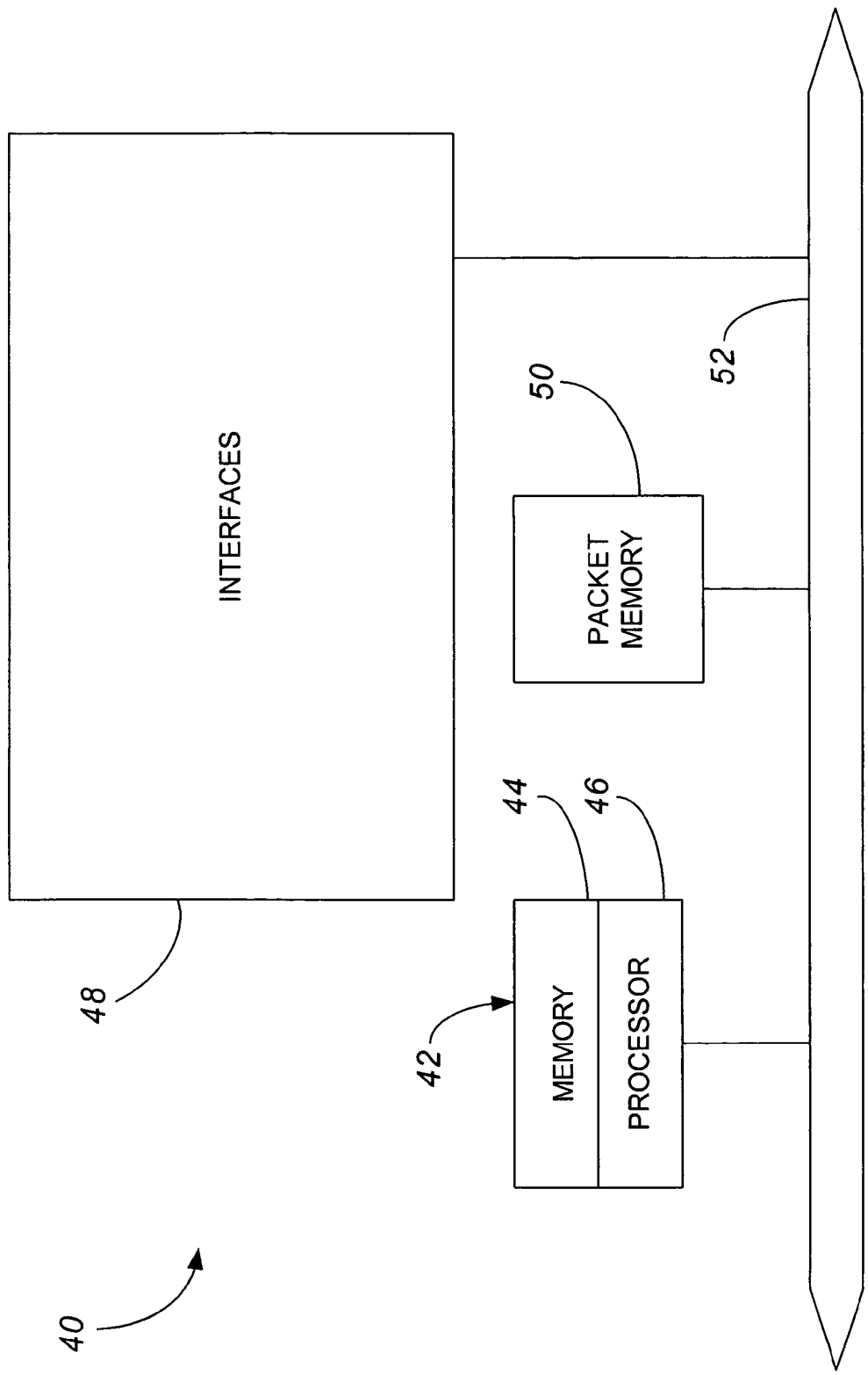
FIG. 3 is a simplified diagram of router hardware suitable for implementing one embodiment of the present invention.

Referring now to FIG. 3, a router 40 suitable for implementing the present invention includes a master central processing unit (CPU) 42, interfaces 48, and a bus 52 (e.g., a PCI bus). As shown, CPU 42 includes a memory 44 and a processor 46. When acting under the control of appropriate software or firmware, CPU 42 is responsible for such router tasks as routing table computations, network management, and general processing of packets. It preferably accomplishes all these functions under the control of software including an operating system (e.g., a version of the Internetwork Operating Systems (IOS®) of Cisco Systems, Inc.) and any appropriate applications software. CPU 42 may include one or more processors 46 such as a processor from the Motorola family or MIPS family of microprocessors. In an alternative embodiment, processor 46 is specially designed hardware for controlling the operations of router 40. Memory 44 can be non-volatile RAM and/or ROM. However, there are many different ways in which memory could be coupled to the system.

The interfaces 48 are typically provided as interface cards (sometimes referred to as "line cards"). Generally, they control the sending and receiving of data packets over the network and sometimes support other peripherals used with the router 40. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces, and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the master microprocessor 42 to efficiently perform routing computations, network diagnostics, security functions, etc. Another function performed by the interfaces may be terminating point to point links, e.g., according to the point to point protocol and providing framing services. Router 40 may further include a packet memory 50 for intermediate storage of packets being forwarded by router 40.

Although the system shown in FIG. 3 is one specific router of the present invention, it is by no means the only architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (including memory 44) configured to store program instructions for the general-purpose network operations and packet processing and management functions described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 1:
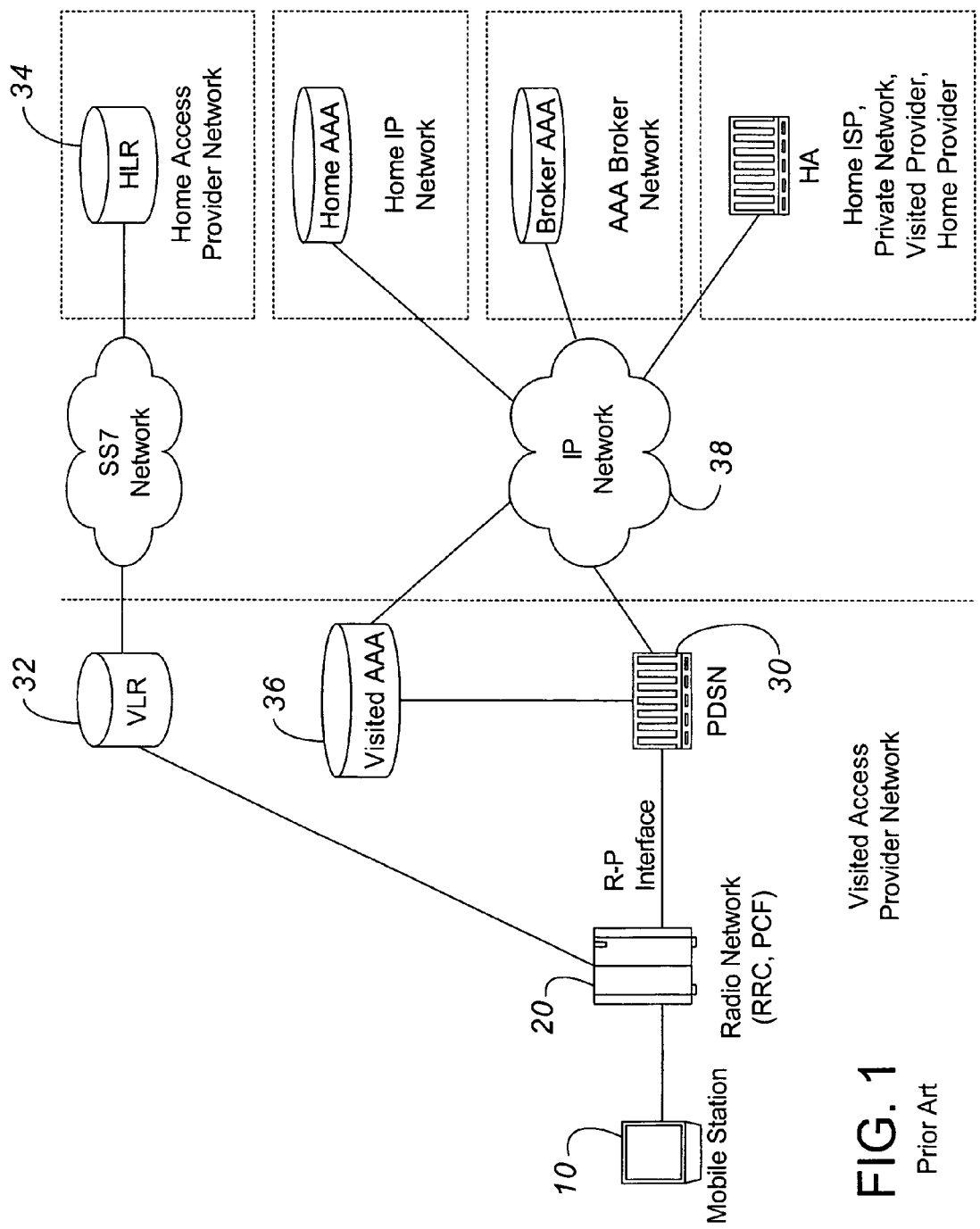
FIG. 1 is a simplified model of the packet data system architecture for a third generation wireless system based on IMT-2000.
Figure 2:
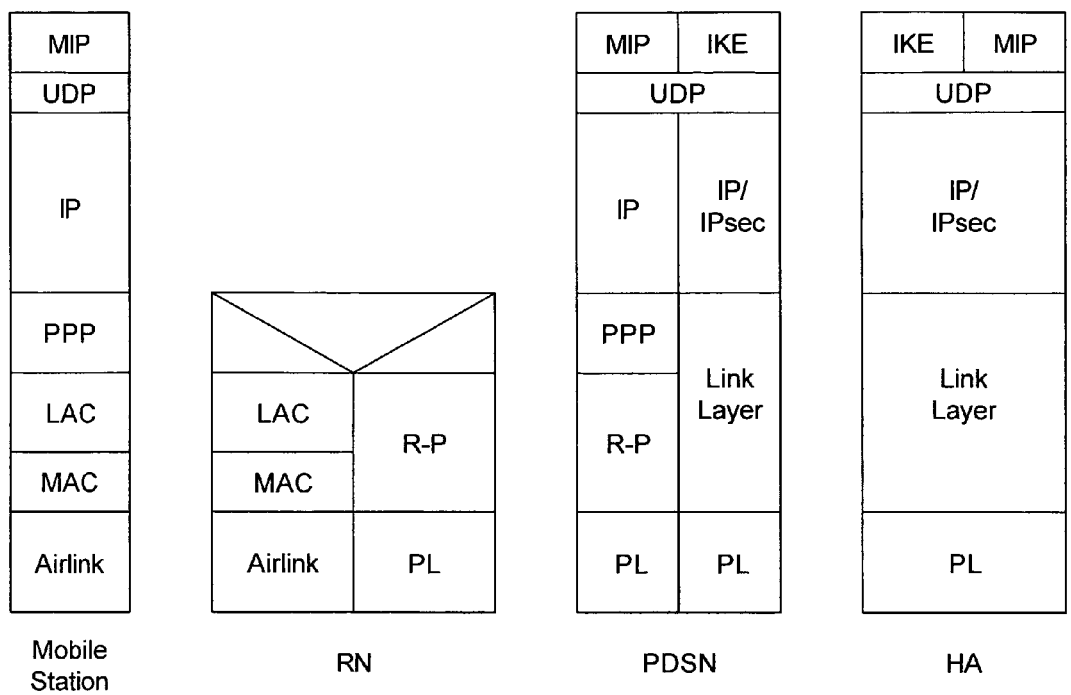
FIG. 2 depicts a protocol reference model usable with the system of FIG. 1 and providing mobile IP control and Internet Key Exchange.

In a CDMA-based cellular packet network, a PPP session can be set up from a mobile station all the way through to the PDSN. The router of FIG. 3 may implement PDSN 30 of FIG. 1 and therefore terminate point to point links from numerous mobile stations. A key functionality for supporting these point to point links is to provide framing services, because link-layer framing facilitates complicated processing of data streams at the receiving end, such as flow control, data compression, signaling, and reliable transmission. At the sending side, data packets from higher layer protocols are framed before being transmitted over the interfaces 48. At the receiving side, data streams from lower layer protocols or the interfaces 48 are deframed before being forwarded to output interfaces 48 or handed over to higher layer protocols for further processing.

These point to point links are operated in accordance with Point to Point Protocol, which is described in RFC 1661 (W. Simpson, Editor), titled "The Point-to-Point Protocol (PPP)", the disclosure of which is hereby incorporated by reference. PPP employs High-Level Data Link Control (HDLC) for framing and deframing servicesover a variety of physical transmission media, such as EIA RS-232, T1/E1, and OC-3. The use of HDLC in PPP is described in the Internet Engineering Task Force's RFC 1662 (W. Simpson, ed.), titled "PPP in HDLC-Like Framing" and RFC 2687 (C. Bormann), titled "PPP in a Real-time Oriented HDLC-like Framing", the disclosures of which are hereby incorporated by reference.

There are several variants of HDLC, including asynchronous HDLC (AHDLC), bit-synchronous HDLC, and octet-synchronous HDLC. The type of framing used depends on the particular hardware interface or protocol requirements. For example, bit-synchronous HDLC is used on most telecommunications interfaces for PPP, such as TI and most ISDN links. AHDLC is used for PPP over asynchronous links and is widely used because laptop computers, 3G cell phones, etc. are typically not equipped with the necessary synchronous hardware.

The sending and receiving ends of a PPP connection may employ two different HDLC framing services. A PC that does not have the necessary synchronous hardware may be connected through an ISDN interface to a system that runs bit- or octet-synchronous PPP, requiring a HDLC framing service system that translates HDLC frames from one type to another. The invention will be described in terms of its application to AHDLC, but one skilled in the art will recognize that the concepts and methods of the present invention have applicability in other respects, and the disclosure hereof is intended to cover all such applications.

Figure 4:
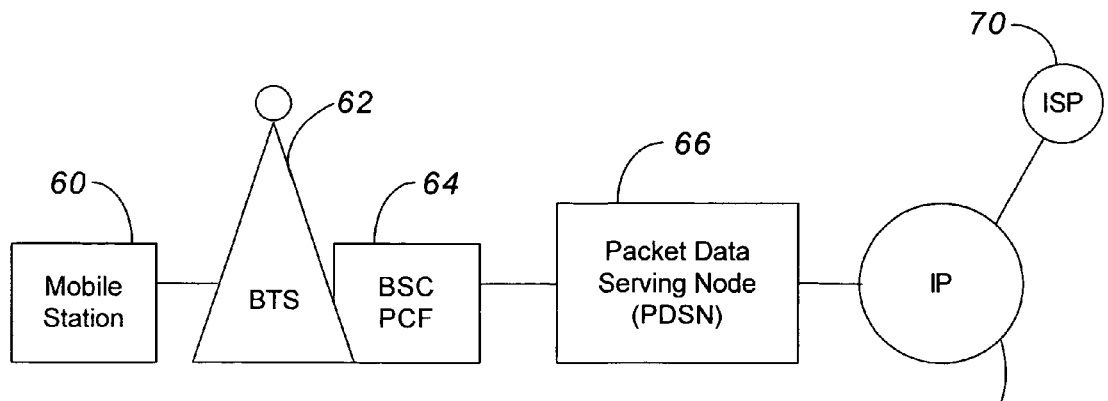
FIG. 4 is a simplified model of the packet data system architecture for a third generation wireless system of the present invention.
Figure 5:
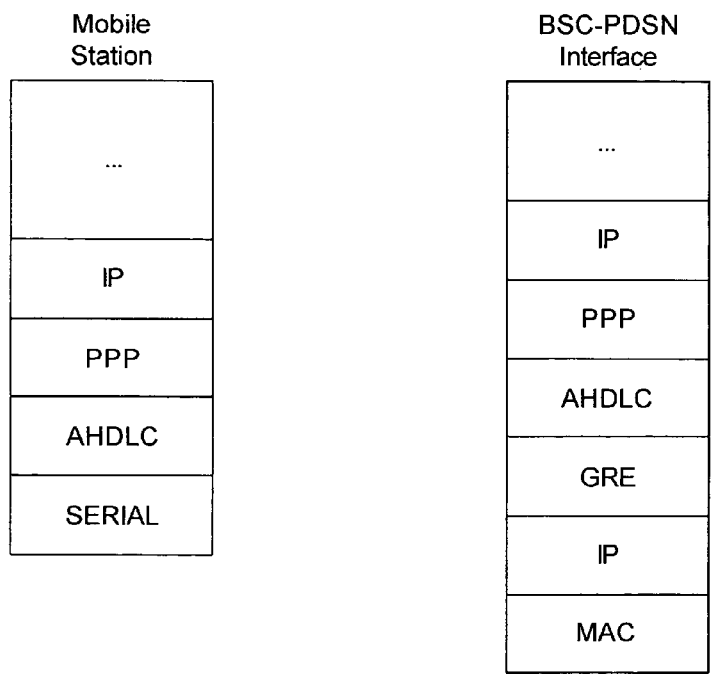
FIG. 5 depicts protocol stacks used in the system of FIG. 4 for the mobile station and BSC to PSDN.

FIG. 4 illustrates how a mobile station 60 can be provided with access to an IP network via a packet data serving node (PDSN 66) according to one embodiment of the present invention. FIG. 5 illustrates protocol stacks operative at mobile station 60 and PDSN 66.

At mobile station 60, higher level applications generate and receive IP packets. These IP packets are communicated through a point to point connection operated in accordance with PPP. Framing services for PPP are provided by the AHDLC protocol. Physical layer communication of the PPP frames to and from a base tower station (BTS) 62 is via an air interface serial connection. BTS 62 embodies a Packet Control Function which is in communication with PDSN 66. The link to PDSN 66 is actually itself via an IP network rather than a point to point connection. To transmit the PPP frames through this IP network, they are encapsulated within IP packets in accordance with Generic Routing Encapsulation (GRE) as described in RFC 1701 (S. Hanks, T. Li, D. Farinacci, P. Traina), titled "Generic Routing Encapsulation (GRE)", the disclosure of which is hereby incorporated by reference.

Thus, the PDSN operates the following protocol stack to interface to mobile station 60 though BTS 62 and BSC/PCF 64. A MAC layer protocol operates appropriately for whatever medium PDSN 66 is directly connected to. Above this, an IP layer handles the communication of IP packets between PDSN 66 and BSC/PCF 64. These IP packets encapsulate PPP data framed in accordance with HDLC. A GRE layer handles the encapsulation and deencapsulation processes. AHDLC and PPP layers terminate the PPP connection from mobile station 60. The higher of the two IP layers then can route IP packets originating with mobile station 60 to points accessible via an IP network 68 as well as IP packets travelling the other direction. Note that there are two different IP layers operating at PDSN 66. A higher IP layer processes packets to/from mobile station 60. A lower IP layer processes packets travelling between PDSN 66 and BSC/PCF 64. Again, these lower layer IP packets encapsulate PPP data framed according to AHDLC.

Because PPP is terminated at the PDSN 66, the PDSN 66 must perform a great deal of AHDLC framing and deframing. One approach for providing the AHDLC framing service is to use a dedicated hardware ASIC chip on each interface 48 in the router of FIG. 3. Data streams from a media interface (e.g., an ATM interface) are directed to this special ASIC chip, and the output frame from this chip is sent for further processing under PPP protocol. However, this approach requires a dedicated ASIC chip for each interface 48 that provides AHDLC framing services. Multiple interfaces 48 cannot share an ASIC chip even if some interfaces 48 are idle. Further, in the case of interfaces that support multiple channels or sub-interfaces (such as an ATM or cable interface), the AHDLC framing service must be able to handle the maximal number of channels or sub-interfaces simultaneously. This is done in a time division multiplexing (TDM) scheme, in which all channels or sub-interfaces (e.g., PPP connections, virtual circuits, etc.) are serviced in round robin fashion. If a channel or sub-interface does not use its allotted AHDLC processing capacity, that unused capacity cannot be used by others. This results in longer AHDLC processing latency for TDM than if capacity could be shared and statistical multiplexing were supported. As disclosed herein, the present invention incorporates the ability to use statistical multiplexing to significantly reduce AHDLC processing latency and increase utilization of the AHDLC processing capacity.

In accordance with the invention, generic AHDLC framing services are provided in an arrangement that permits sharing of AHDLC processing capacity among multiple interfaces, and makes more efficient use of system resources. A limited number of AHDLC framing engines can be used to serve the whole router system instead of requiring per-channel AHDLC service engines for the maximal number of channels supported. Using dynamic channel allocation, data streams from one interface may receive preferential treatment over others if desired, to improve end-to-end quality of service for that interface. Although the invention is being described in terms of its application to AHDLC framing services, one skilled in the art will readily recognize that the concepts of the invention may be applied with equal facility to framing, translation, and other processing under other protocols.

Figure 6:
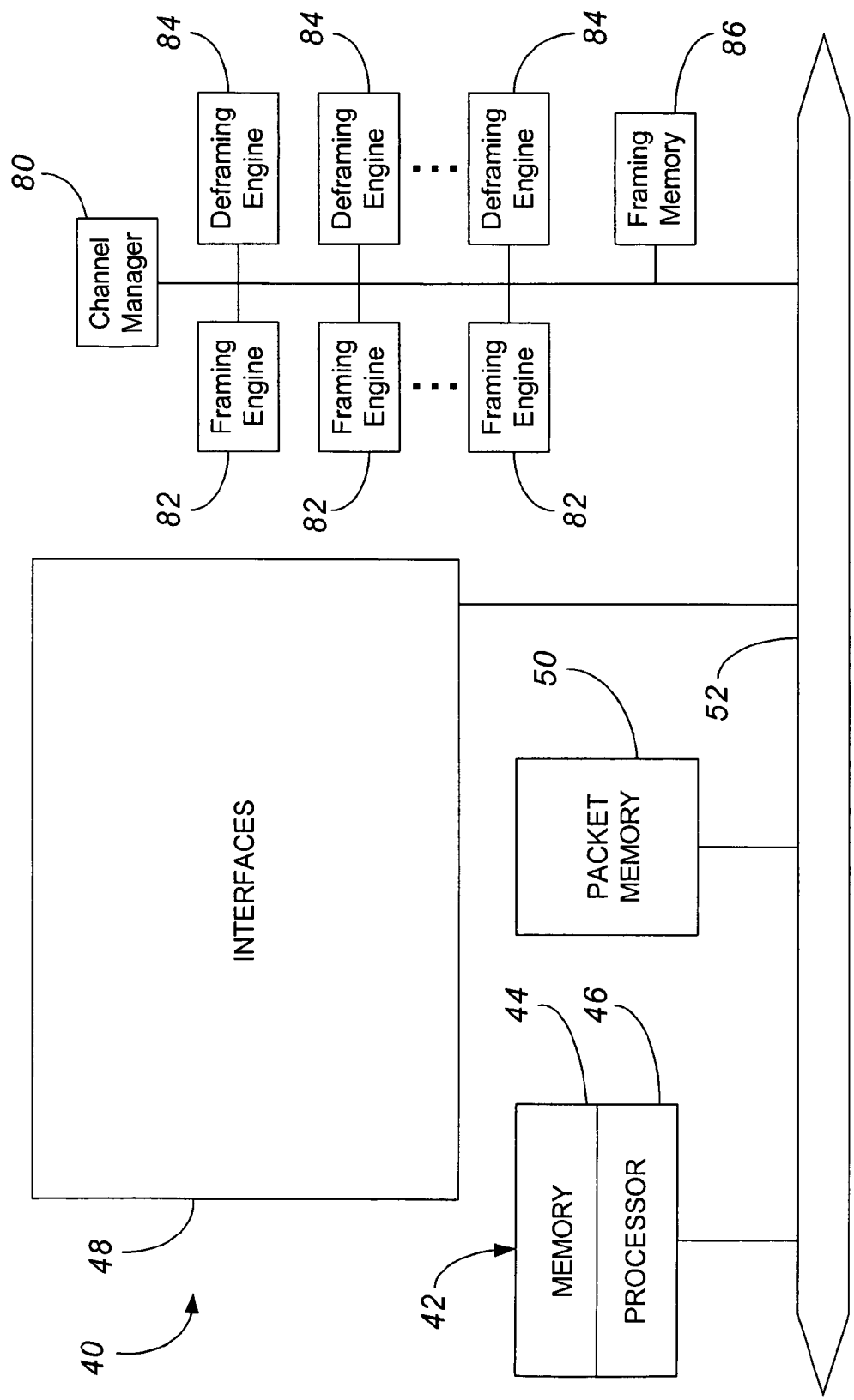
FIG. 6 is a simplified model of the packet data system architecture for a third generation wireless system embodying the invention.

FIG. 6 shows the router system of FIG. 3 with an improved AHDLC framing service in accordance with the invention. An AHDLC service system may be included as a separate card within the router system. In one embodiment of the invention, the AHDLC service system comprises a channel manager 80 and one or more channelized framing and deframing service engines 82 and 84. A framing engine that performs both framing and deframing may be used as well. The framing and deframing engines 82 and 84 may be implemented in software or in hardware such as ASIC chips, and perform framing/deframing, reassembling, and FCS checksum functions. These engines are shared by interfaces, sub-interfaces, and channels in the router system. The channel manager 80 performs the task of dynamically allocating a framing engine 82 or deframing engine 84 to an interface, sub-interface, or channel. The channel manager 80 may be implemented in hardware or in software. A framing memory 86 is shown where interfaces may store data to be frames or retrieve frames generated by one of the framing services engines. It should be understood that although FIG. 6 depicts the channel manager 80, framing engine 82, and deframing engines 84 separately, they could be structured so that some or all of them are present on the interfaces 48.

The framing and deframing engines 82 and 84 are employed for outgoing and incoming traffic. Each service engine is channelized in the sense that multiple data streams can be handled simultaneously, independent of the arrival time of traffic streams from different interfaces, sub-interfaces, or channels. In order to accomplish this, the service engine maintains the intermediate state for each channel.

There is a logical AHDLC service agent for each channel, up to the maximum number of channels supported.

All logical AHDLC service agents share one or more processing units that perform AHDLC framing or deframing services (service engines). A service engine that serves fewer channels at a given moment may have more processing cycles and therefore, shorter latency, than another engine that serves more channels. Different policies for allocating capacity to different channels create flexibility to provide different levels of service. For example, the processing capacity in a service engine can be allocated statically, such as in a First-Come-First-Served (FCFS) or round robin fashion. It can be allocated dynamically by giving higher priority to channels that have higher priority assigned to them. A channel waiting for its data stream to be served may buffer its data in main memory, to be sent to the service engine through DMA (direct memory access). Assignment of a logical service agent to a channel is dynamically performed by the channel manager 80.

As described herein, the logical service agents are dynamically allocated and deallocated to an interface or sub-interface, such as an ATM VC (virtual circuit) a frame relay VC, or a cable channel. The channel manager 80 maintains a global table that records the current allocation and load information for each service engine 82 and 84.

When an interface or sub-interface is configured or a channel is established, a request is made to the channel manager 80 for allocation of a logical AHDLC service agent. The channel manager 80 can be configured to further distinguish whether the requesting channel is a simplex or duplex connection, and perform allocations accordingly (such as to a logical framing agent and/or a logical deframing agent).

Upon receiving the request for allocation of a logical service agent, the channel manager selects an AHDLC service engine 82 or 84. The selection decision may be static, based on the number of channels that have been allocated to each of the service engines 82 and 84 (e.g. selecting the service engine with the fewest channels allocated to it). However, this would not necessarily reflect the actual load on the engine, because many channels can sit idle. Traffic statistics for each service engine 82 or 84 can be collected and periodically sent to the channel manager 80. Based on this load information indicating the utilization of the service engine, the selection of a service engine 82 or 84 can be based on the dynamic traffic load of each service engine, so that the channel manager 80 can select the service engine with the lowest load.

Once a framing or deframing service engine 82 or 84 has been selected by the channel manager 80, the channel manager 80 allocates an idle agent associated with a channel in that service engine 82 or 84. This results in the association of the data path of the interface, sub-interface, or channel with the allocated logical framing/deframing agent. If the service engine 82 or 84 uses multiple job queues, the channel may be associated with a job-queue with the appropriate priority. For example, a time critical data stream may be assigned to a logical agent for a channel associated with a high priority job queue in the selected service engine 82 or 84.

After the logical agent associated with an AHDLC service engine 82 or 84 has been allocated, the data stream from the assigned interface, sub-interface, or channel is forwarded to the allocated AHDLC service engine 82 or 84. Data streams received from a device may be buffered in the router processor 42, in a virtual interface processor (VIP) implemented within a shared processor, in main memory, or in framing memory 86 before being sent to the AHDLC service engine 82 or 84. Similarly, data streams (such as AHDLC frames) coming from the AHDLC service engine 82 or 84 may be buffered before being transmitted or processed further. The framing or deframing agent and its associated channel in the service engine 82 or 84 are deallocated when the interface or sub-interface is shut down or the channel is closed.

One skilled in the art will recognize that there are many advantages to the invention. Because there is no dedication of an AHDLC service engine to an interface, sub-interface, or channel, AHDLC framing and deframing capacity can be shared in an efficient manner, thus reducing the cost for hardware to perform AHDLC framing in a router system. Because the AHDLC service engine does not have to be shared in a TDM scheme, processing capacity is not wasted on idle channels and is used more efficiently. Further, the configuration of the AHDLC as a standalone service facilitates "plug-and-play" addition of more framing and deframing service engines, because it is independent of interface type and transmission media type. The framing and deframing engines can be dynamically configured, such as changing the asynchronous control character map (ACCM) and frame check sequence (FCS) sizes for different interfaces or channels. The configuration can be changed after an engine is allocated. Additionally, the framing and deframing engines are dynamically allocated when requested by interfaces, sub-interfaces, and channels, and different allocation policies can be implemented. For example, an interface or channel with higher priority may be given priority in allocation of AHDLC framing services. A time critical channel that is sensitive to delays may receive service from an AHDLC engine that is currently serving fewer channels. The channel manager may also reallocate service engines in order to balance loads among the service engines. Additionally, the framing and deframing services are decoupled from each other, and an interface or channel may request only framing or only deframing services according to its needs.

It is understood that the examples and embodiments are described herein are for illustrative purposes only and that various modifications and changes in light thereof will be suggested to persons skilled in the art and are to be included within the spirit and perview of this application and scope of the appended claims and their full scope of equivalents. For example, the separation of the framing services from the interfaces is not limited to AHDLC protocol and may be applied to other protocols requiring framing, and it is intended that the disclosure apply to such other protocols as if fully set forth herein. All publications, patents, and patent applications cited herein are hereby incorporated by reference.

What is claimed is:

1. A packet forwarding system comprising:
   (a) an interface system for receiving packets and having a plurality of channels;
   (b) a plurality of framing service engines; and
   (c) a channel manager for assigning channels to ones of the framing service engines, the channel manager being arranged to dynamically assign the channels and configured to receive data about the framing service engines, the channel manager further being configured to assign channels to ones of the framing service engines on the basis of the data, the data including information about utilization of framing service engines, wherein at least one framing service engine is configured to frame packets from higher layer protocols and at least one framing service engine is configured to deframe packets from lower layer protocols.

2. The system as recited in claim 1, wherein the framing service engines are configured to operate on AHDLC packets.

3. The system as recited in claim 2, wherein the interface system comprises a plurality of network interfaces terminating a plurality of point to point links.

4. A packet processing system comprising:
an interface system comprising a plurality of network interfaces, said interface system terminating a plurality of point to point links; and
a framing system providing framing services to support said plurality of network interfaces in terminating said plurality of point to point links, wherein said framing system comprises a plurality of framing service engines and a channel manager, the channel manager being arranged to actively allocate framing service engine ones of said plurality of point to point links requiring framing services, and wherein at least one of said framing service engines includes a framing engine and a deframing engine, the framing engine being arranged to frame data packets from higher layer protocols and the deframing engine being arranged to deframe data streams from lower layer protocols.

5. The packet processing system of claim 4 wherein said channel manager that actively allocates framing service engine ones of said plurality of point to point links requiring framing services dynamically allocates said framing service engine ones of said plurality of point to point links.

6. The packet processing system of claim 4 further comprising a framing memory to buffer communication between said plurality of framing service engines and said plurality of network interfaces.

7. The packet processing system of claim 4 wherein said plurality of point to point links operate according to PPP and said framing system provides framing services in accordance with HDLC protocol.

* * * * *